April 10, 1928.
C. L. KEY
WEEDER
Filed June 4, 1925
1,665,464
2 Sheets-Sheet 1
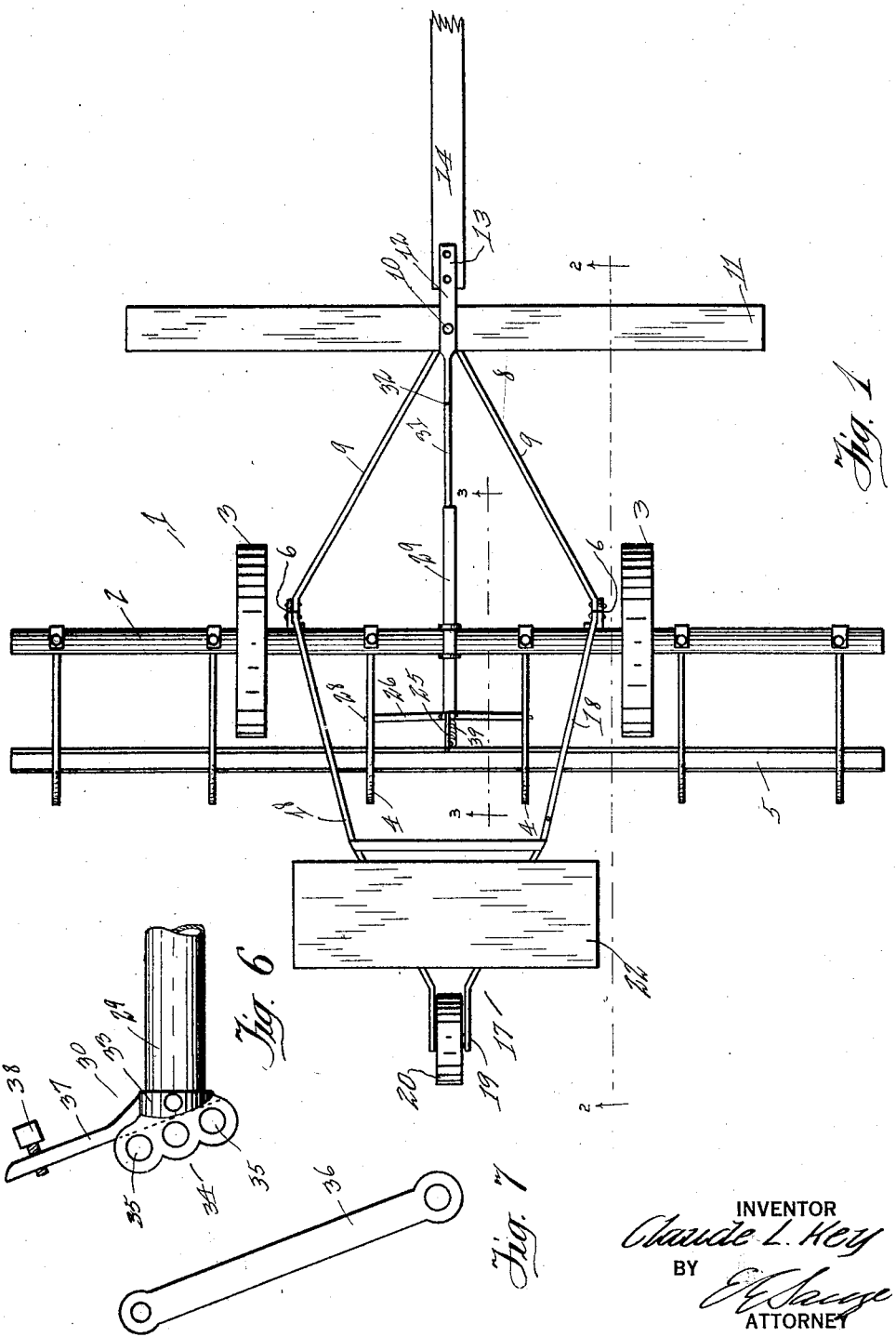
INVENTOR
Claude L. Key
BY
ATTORNEY

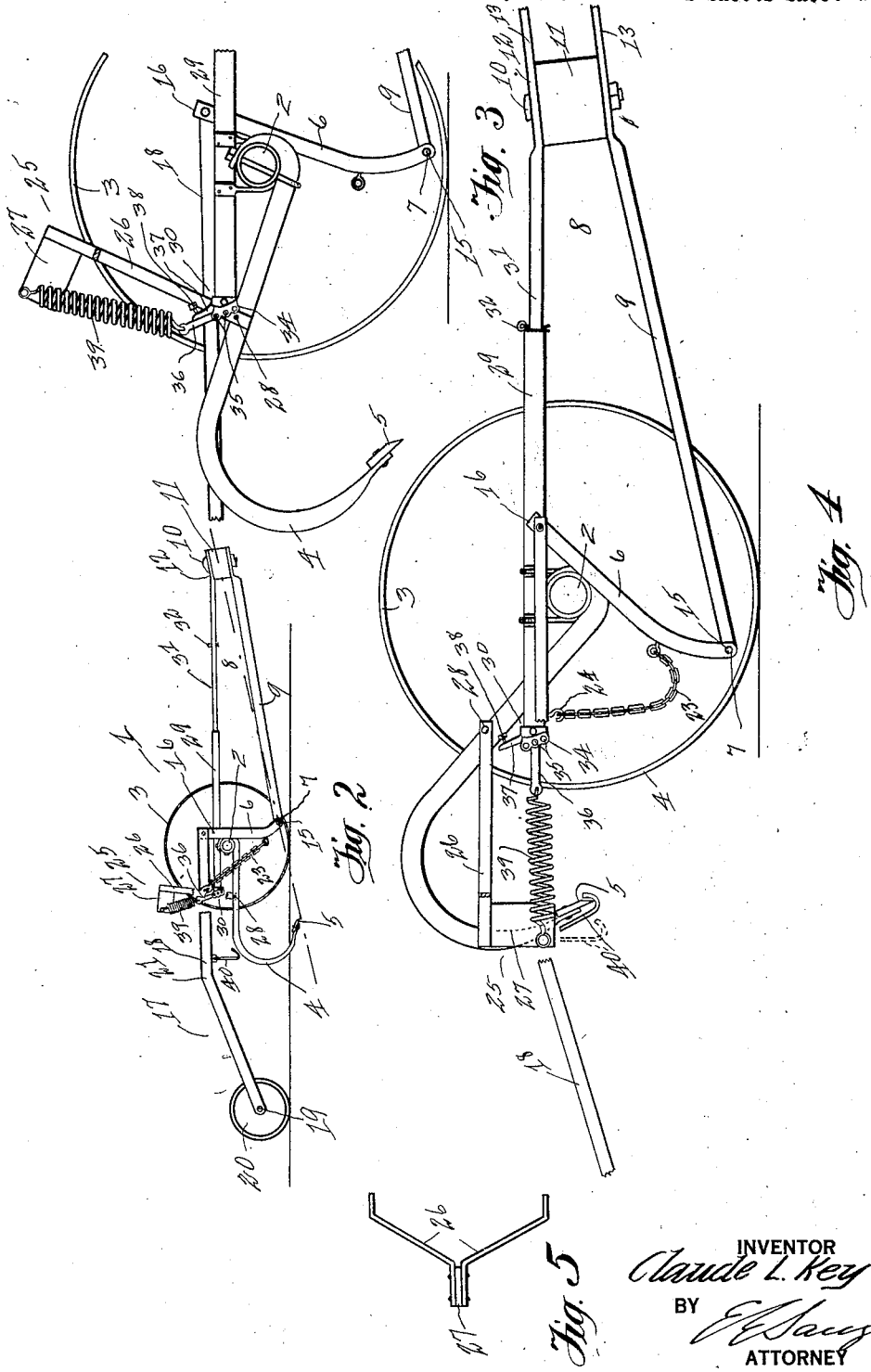

Patented Apr. 10, 1928.

1,665,464

UNITED STATES PATENT OFFICE.

CLAUDE L. KEY, OF MILTON, OREGON.

WEEDER.

Application filed June 4, 1925. Serial No. 34,840.

This invention relates to weeders and has as one of its objects to provide a weeder having an automatic means for cleaning the blade of weeds.

Another object of the invention is to provide a weeder having a depth of cut readily adjustable and whose blade is maintained at the adjusted depth by means of the draft means.

A further object of the invention is to provide a weeder whose blade is raised out of the ground by the draft means for dumping purposes, and having a means whereby the blade is maintained in the raised position to render the weeder inoperative while moving from place to place.

A further object of the invention is to provide a weeder having an automatic cleaning means that is operable with the dumping means.

With these and other objects of the invention reference is now had to the accompanying drawings in which Fig. 1 is a plan view of the weeder;

Fig. 2 is a sectional elevation of the weeder taken on the line 2—2 of Fig. 1;

Fig. 3 is an enlarged sectional elevation of the weeder taken on the line 3—3 of Fig. 1;

Fig. 4 is an enlarged view similar to Fig. 2, but showing the blade in a different position;

Fig. 5 is a front elevation of the hammer showing the form of the hammer arms;

Fig. 6 is an enlarged side elevation of the pivotal head; and

Fig. 7 is an enlarged side elevation of the spring link.

Having reference to the drawings like numerals refer to like parts throughout the several views and the numeral 1 refers to a weeder section which consists of a tubular beam 2 rockably supported by wheels 3 mounted on the beam in a position relatively midway between the center and ends of the beam, goose-necks 4 rigidly secured to the beam and carrying a blade 5 in the usual manner, both the blade and the goosenecks being designed to rock with the beam.

Rigidly attached to the beam are uprights 6, preferably two in number, and these uprights are also arranged to rock with the beam.

Pivotally attached to the lower end 7 of the uprights is a draft means 8 consisting of diagonally positioned bars 9 that meet in a common center in a manner to receive a king bolt 10 thereat upon which is movably mounted an evener 11, the evener being secured properly by the addition of a top plate 12 that will be presently explained.

The bars 9 may be extended, as at 13, to attach to a tongue 14, similar to that shown in Fig. 1, or obviously separate pieces may be used for this purpose.

The pivotal point 15 connecting the bars with the uprights is arranged so that the line of draft will be in a direct line, extending from the lower cutting line of the blade through the pivotal point 15 to the center of the king bolt, as shown by the broken and dotted line in Fig. 2. By this means, and assisted slightly by the weight of the weeder, the blade will be maintained in the cutting position in the ground, this position being shown in Fig. 2.

By connecting the bars to the lower end of the uprights it is evident that by backing, the beam, and with it the gooseneck and blade will be rocked in a clockwise direction, and that this movement will raise the blade out of the ground.

This movement is called dumping as practically all weeds are dumped from the blade as it passes from the ground.

As the bars 9 are pulled forward an anticlockwise movement occurs that will position the blade in the ground for further operation.

Attached to the upper end 16 of the uprights, and supported thereby, is a trailer 17 consisting of diagonally positioned frame pieces 18 that extend rearward from the uprights to provide for a journal 19 wherewith to accommodate a trailer wheel 20 that in turn supports the rear end of the trailer.

The frame pieces 18 are bent at the point 21 to provide room for the blade when raised to the extreme position shown in Fig. 4.

A platform 22 is attached to the frame pieces and, as the weeder may consist of several sections if desired, the platform may also extend to other framework and answer for a platform for both sections.

By observing the drawing shown in Fig. 4 it will be obvious that a direct pull on the bars 9 would tend to rock the beam in an anticlockwise direction and thus bring the bars, the uprights and the trailer in a straight line, unless some means to overcome this tendency was utilized. This movement is overcome by a chain 23, or other adjustable means, the chain being attached to the upright 6 as shown, with an adjusting hook 24 attached to the trailer to receive the chain.

By this arrangement the chain is made use of as an adjusting means for the blade, and while supporting the members as above explained, will be utilized to adjustably regulate the depth of the blade in the ground.

As a further means for cleaning the blade a hammer 25 is provided that consists of forked shaped arms 26 carrying a head 27 suitably attached to the arms, with the arms pivotally attached to the goosenecks at the point 28 in a manner that the hammer will strike the blade under certain conditions to be mentioned and explained.

The cleaning means further consists of a tubular member 29 secured to the beam 2 in a manner to permit the beam to rock without effecting the position of a pivotal head 30 attached to the rear end of the tubular member, the head remaining in a fixed position vertically by means of a sliding member 31 that is projected forward to receive the king bolt 10 that now properly secures the evener, and which by slidably engaging the tubular member prevents its rotation with the beam.

A bolt 32 acts as a stop in the sliding member and is utilized to regulate the rocking of the beam in the clockwise direction, and thus by regulating the movement of the beam and the gooseneck attached to it, to act as a further adjusting means for the automatic operation of the hammer 25.

The tubular member 29 extends rearward from the beam and is provided on its rearward end with the above mentioned pivotal head 30 and this head consists of a short sleeve 33 attachable to the tubular member in any suitable manner, a clevis 34 that is formed integral with the sleeve and provided with adjusting holes 35, the latter forming pivotal points for the link 36 that is pivotally mounted therein, and an upright stop 37 extending upward from the head and against which the link will rest under conditions to be presently mentioned.

The stop is provided with a set screw 38 wherewith to regulate the position of the link.

A spring 39 is now attached to the hammer head 27 and to the link to complete the cleaning means.

It will now be noted that the normal position of the pivotal point of the hammer is below and slightly to the rear of the pivotal points of the head. With this in mind and with the parts in the position as shown where the blade is in the ground the automatic action will now be explained:

With the blade in the position above mentioned the spring 39 will be in a relaxed condition and with the link 36 forms a straight line from its pivotal point to its point of connection with the hammer head 27. Under this condition the combined weight of the hammer and the spring tends to throw the hammer downward while the tension of the spring pulling from a point back from the pivotal point of the hammer overcomes this tendency and maintains the hammer in an upright position.

As the blade is rocked backwards to the position shown in Fig. 3, being a partial rocking, the pivotal point of the hammer is brought to a point practically on line with the pivotal point of the head 30 but, the link, which now engages the stop, holds the spring to a position almost parallel with the arms 26 of the hammer and the weight of the hammer head and arms pulls the hammer forward and downward over the slight leverage obtained by the distance between the respective pivotal points.

As the blade reaches the position shown in Fig. 4, the position of maximum rotation, the relative position of the pivotal points of the hammer and the head 30 are again changed with the result that the spring is now brought under greater tension by bringing the pivotal point of the hammer above and forward of the head, and that in this position the spring will automatically force the hammer down when the head of the hammer will strike the blade a sharp quick blow that will jar all loose stuff from the blade and thoroughly clean it of the weeds.

As the blade is returned to the ground the movement above described is reversed and the hammer is again elevated and restored to a position ready for further operation, both operations obviously being automatic with the rocking of the blade with the beam.

The blade may be supported in the raised position for transportation by a hook 40 attached to the frame 18 of the trailer, the hook being hung in a manner requiring advancing to engage the blade and so that gravity will pull the hook back out of the way of the descending blade when it is released by a backward movement of the draft means.

In use a team or other prime mover is hitched to the weeder in the usual manner, and with the blade hooked up the weeder is moved to its place of operation.

The blade is then released from the hook as above explained and as the weeder moves over the ground the blade will be drawn into the soil according to the depth permitted by the adjustable control, there to cut the weeds.

As the work progresses and the weeds begin to accumulate on the blade it is dumped by a slight backward movement of the prime mover.

The weeder now advances again with the blade in the ground as before and this operation is repeated until such time as the blade accumulates weeds that cannot be cleaned by this means when the blade is rocked to its maximum distance which movement causes the hammer to fall and strike the blade with sufficient force to jar the remaining weeds therefrom.

As this movement requires only the time necessary to back the team, and as the blade will reenter the ground ordinarily behind where it left it, the weeder will start anew with a perfectly clean blade without any undue loss of time.

Having thus described my invention, I claim:

1. In a weeder, a rockably supported beam rigidly carrying goosenecks, and a blade rigidly attached to said goosenecks, uprights rigidly attached to and rockable with said beam, a draft means pivotally attached to the uprights to rock the latter in a clockwise or anticlockwise direction, a trailer pivotally attached to said upright and provided with means to adjustably control the anticlockwise movement of said uprights, a cleaning hammer pivotally attached to said goosenecks to strike said blade, and means to automatically operate said hammer.

2. In a weeder, a rockably supported beam rigidly carrying goosenecks, and a blade rigidly attached to said goosenecks, uprights rigidly attached to and rockable with said beam, a draft means including a king bolt and diagonally positioned bars, the latter pivotally attached to the lower end of said uprights, with the pivotal point of attachment normally positioned in a line extending from the lower cutting line of the blade through the pivotal point to the king bolt, said means being adapted to rock the uprights in a clockwise or anticlockwise direction, a trailer pivotally attached to said uprights, means attached to said trailer and to said uprights to adjustably control the anticlockwise movement of said uprights, a cleaning hammer pivotally attached to said goosenecks to strike the blade, and means to automatically operate said hammer upon the rocking of said blade with said beam.

3. In a weeder, a rockably supported beam rigidly carrying goosenecks and a blade rigidly attached to the goosenecks, uprights rigidly attached to and rockable with said beam, a draft means attached to said uprights to rock the uprights in a clockwise or anticlockwise direction, a trailer supported by and pivotally attached to the upper end of said uprights, means to adjustably control the anticlockwise movement of said uprights, a cleaning means to clean the blade, and means to automatically operate said cleaning means upon the rocking of said blade with said means.

4. In a weeder, a rockably supported beam rigidly carrying goosenecks and a blade rigidly attached to the goose-necks, uprights rigidly attached to and rockable with said beam, a draft means attached to said uprights to rock the uprights in a clockwise or anticlockwise direction, a trailer supported by and pivotally attached to the upper end of said uprights, means attached to said trailer and to said uprights to adjustably control the anticlockwise movement of said uprights, a cleaning means comprising a hammer pivotally attached to said goosenecks to strike the blade, a pivotal head, and a yielding means attached to said hammer and to the pivotal head, the pivotal point of said hammer and said pivotal head being arranged to change their relative positions with the movement of the blade with said beam to automatically operate said hammer.

5. In a weeder, a rockably supported beam rigidly carrying goosenecks and a blade rigidly attached to the goosenecks, uprights rigidly attached to and rotatable with said beam, a draft means attached to said uprights to rock the uprights in a clockwise or anticlockwise direction, a trailer supported by and pivotally attached to the upper end of said uprights, means attached to said trailer and to said uprights to adjustably control the anticlockwise movement of said uprights, a cleaning means comprising a hammer pivotally attached to the goosenecks, to strike the blade, a pivotal head, a link adjustably and pivotally attached to said head, a spring attached to the hammer and to said link, the pivotal point of said hammer and said pivotal point of the link being arranged to change their relative positions with the movement of the blade with said beam to automatically operate said hammer, and means attached to said trailer to support the blade in a raised position.

6. The combination with a weeder, having a blade and having a dumping means, comprising means to raise the blade out of the ground, of a cleaning means comprising a hammer pivotally attached to said weeder and operable by the movement of said blade.

In testimony whereof I affix my signature.

CLAUDE L. KEY.